Nov. 11, 1947.  G. W. CRISE  2,430,759
AIR CONDITIONING SYSTEM FOR MOTOR VEHICLES
Filed Jan. 27, 1945  2 Sheets-Sheet 2
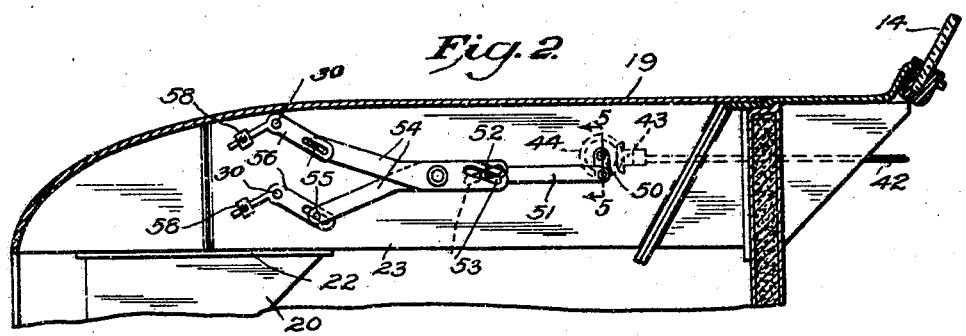
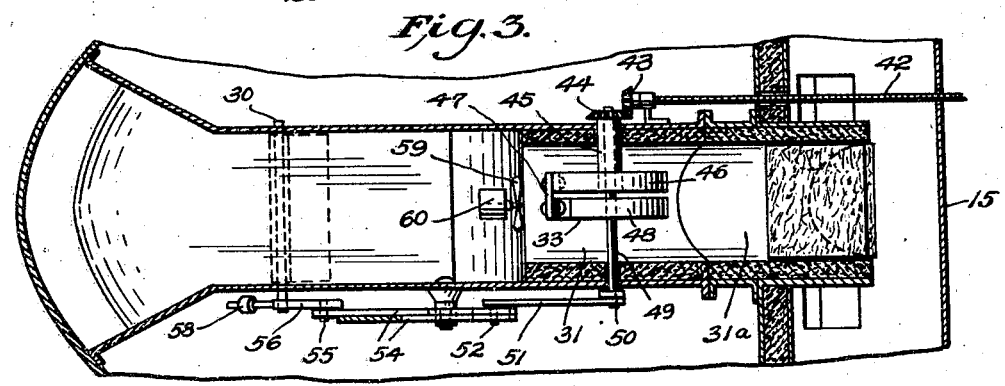
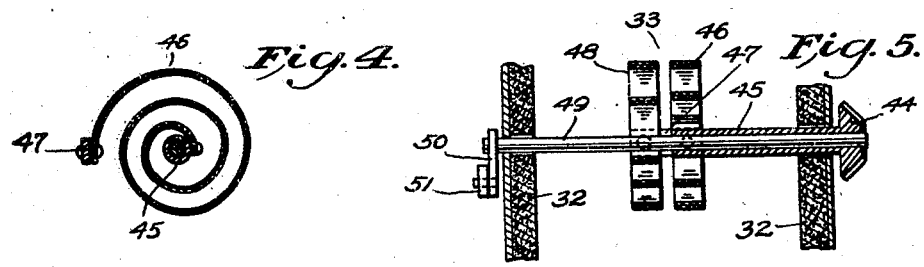
Inventor
G. W. Crise
By W. A. McDowell
Attorney Patented Nov. 11, 1947

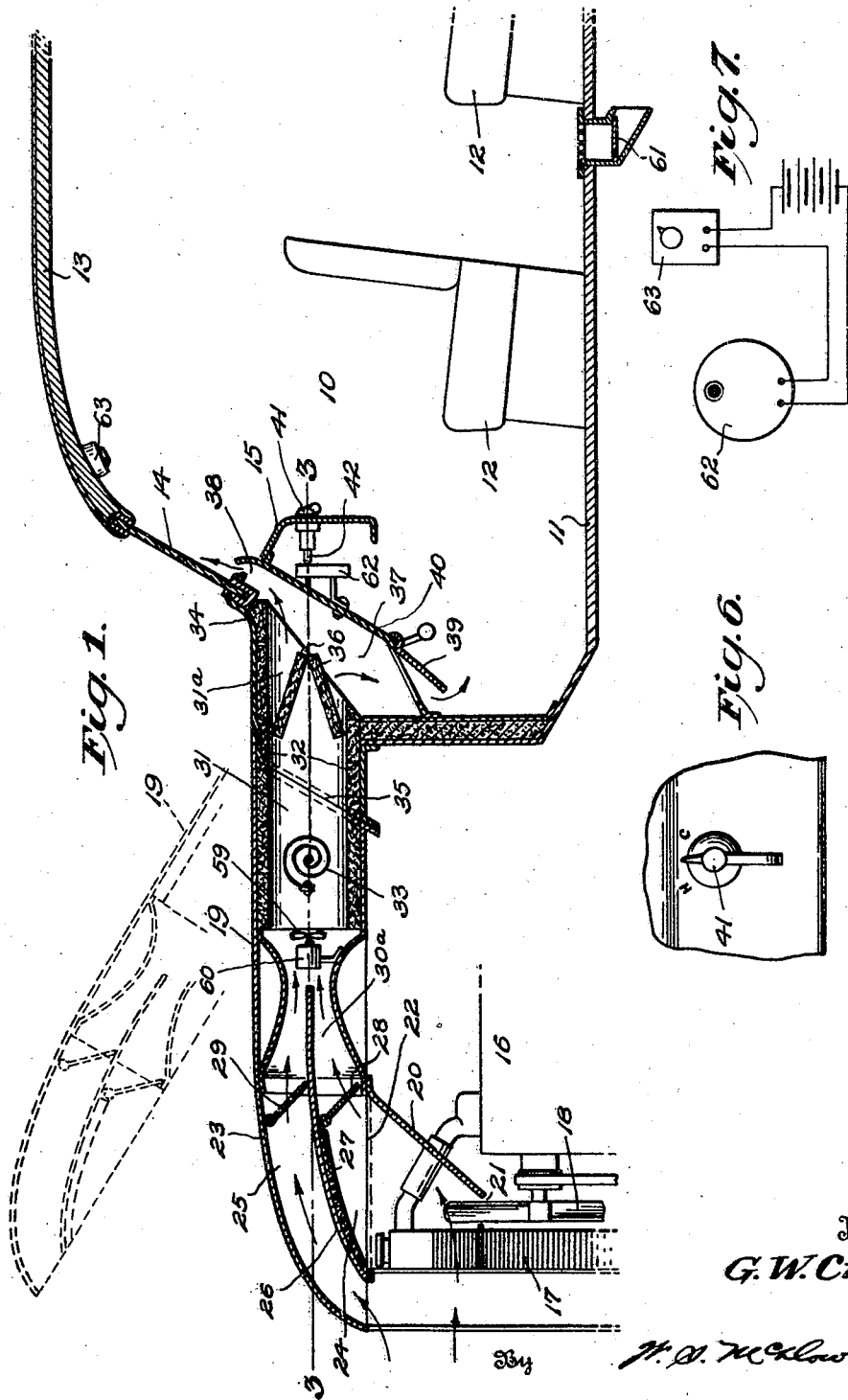

2,430,759

UNITED STATES PATENT OFFICE 2,430,759

AIR-CONDITIONING SYSTEM FOR MOTOR VEHICLES

George W. Crise, Columbus, Ohio

Application January 27, 1945, Serial No. 574,868

11 Claims. (Cl. 237—2)

The purpose of my invention is to provide an efficient and dependable air-conditioning system for automobiles.

It is well known that in present motor cars, a standard water thermostat is used on the motor head to maintain a discharge temperature of approximately 150° F. for the water flowing from the cooling jackets of the engine into the top of the radiator, thereby providing a source of warmed air of uniformly high temperature at the top of the radiator core.

It is also present practice to extend the hood of the car well in front of, and clearing by some inches, the top of the radiator, thereby providing a natural channel for fresh unheated air to flow over the top of the radiator.

The object of my invention is to provide novel means to properly throttle and intermingle these two columns of air, so as to attain the proper temperature of air under pressure delivered to the back of the vehicle wind shield for defrosting purposes, and to the body of the car for internal heating and cooling.

For a further understanding of the invention, reference is to be had to the following description and the accompanying drawings, wherein:

Fig. 1 is a vertical longitudinal sectional view taken through a motor vehicle provided with the air conditioning system constituting the present invention;

Fig. 2 is a fragmentary vertical sectional view taken through the hood structure of the motor vehicle and disclosing the thermostatically operated valve-controlling levers utilized by the present invention;

Fig. 3 is a horizontal sectional view taken on the plane indicated by the line 3—3 of Fig. 1;

Fig. 4 is a detail sectional view of the bimetallic temperature-controlling unit;

Fig. 5 is a transverse sectional view on the line 5—5 of Fig. 2;

Fig. 6 is an elevational view showing the dash control for the thermostatic unit;

Fig. 7 is a diagrammatic view of one of the electrical controls.

Referring more particularly to the drawing, the numeral 10 designates the passenger-seating body of an automobile, the same being provided with the usual floor 11, seats 12, top 13, wind shield 14 and an instrument panel 15. The frame of the automobile in front of the body carries the usual engine 16 having associated therewith a water-cooling radiator 17 and a fan 18. The top of the compartment in which the engine is situated is normally closed by a vertically swinging bonnet 19, the latter being capable of being raised, as indicated in dotted lines in Fig. 1, to provide access to the engine compartment.

The air conductor of my system is composed of three principal parts; first, a shroud 20, the latter being formed to enclose the upper part of the radiator 17 and having a slot 21 through which the upper tips of the blades of the fan 18 rotatably project. Also, the shroud is formed with a horizontally disposed flange 22 with which the second or bonnet section 23 of the air duct makes sealing contact.

The bonnet section 23 is formed to constitute a unitary part of the bonnet 19, and has in its forward end a lower warm air passage 24, which constitutes a continuation of the chamber or compartment formed by the shroud 20. Also, the bonnet section 23 includes an upper or cool air passage 25 which is separated from the passage 24 by a curved divisional wall 26. Preferably, the under side of the wall 26 is provided with a layer of thermal insulation 27 to prevent undesired heat transmission between the air flowing through or contained in said passages. Air flow through both of these passages is controlled by counterweighted damper valves 28 and 29, the latter being provided with shafts 30 which are journaled in the side walls of the bonnet section 23 for association with external operating means hereinafter described.

The passages or ducts 24 and 25 to the rear of the damper valves 28 and 29 narrow into a common restricted passage 30a in which the divisional wall 26 terminates, so that air flowing through one of the passages 24 or 25 creates suction forces in the other. Air discharged from the Venturi passage enters and travels through a horizontal duct 31, the walls of the latter being lined, preferably, with a sound deadening and insulating material 32.

Also, arranged within the duct 31 is a bimetal unit 33 which, in its response to varying temperatures, is employed to control automatically the operating positions of the valves 28 and 29. The forward part of the duct 31 is formed in the bonnet 19 and is, therefore, movable with said bonnet, while the rear part 31a of the duct is formed in the cowl construction 34 of the motor vehicle and comprises a stationary part, the cowl and bonnet portions of the duct being normally joined along the diagonally disposed meeting faces 35. In the stationary part 31a of the duct, there may be mounted air-cleaning filters 36.

When the hood or bonnet 19 is in its down or closed position, there is no interruption in the ducts 31 and 31a, air flowing therethrough into a distributing or plenum chamber 37, from which it is distributed by way of the slot 38 to the wind shield 14 for use in a defrosting or other similar capacity, or it may flow into the interior of the vehicle body 10 when the pivoted valve door 39 occupies an open position. The valve door is carried by the back wall 40 of the plenum chamber, the wall 40 being joined with the instrument panel 15. The door 39 is manually controlled and may be opened and closed at will.

The temperature control system embodies an indicating control knob 41, the latter being mounted on the instrument panel for manual actuation. Connected with the journaling extension of the knob is one end of a flexible shaft 42, the latter extending forwardly from the instrument panel, through the cowl construction, and has its forward end connected with the shaft of a rotatably mounted beveled gear 43, the latter meshing with a corresponding gear 44 which is mounted on or formed with the outer end of a sleeve 45. The sleeve extends into the duct 31 and has mounted on its inner end a bimetal spiral 46, forming a part of the unit 33. The outer free end of the spiral 46 is united by means of a bar 47 with the outer end of a second bimetal spiral 48, the inner end of the latter being fastened to a shaft 49 which is journaled in the walls of the duct 31 and in the sleeve 45. Exteriorly of the duct 31, the shaft 49 is provided with a crank 50. This crank responds to temperature changes in the duct 31 by substantial rotation, moving the link 51 connected therewith forwardly and backwardly. A pin 52, carried by the forward end of the link, passes through relatively angularly disposed slots 53 provided in the rear ends of a pair of pivotally mounted scissor action levers 54. The forward ends of these levers are provided with pins 55, which are received in slots provided in the rear ends of crank arms 56, the hubs of these arms being connected with the ends of the shafts 30 of the valves 28 and 29. The arms 56 also carry adjustable counterbalancing weights 58 for balancing the valves 28 and 29.

If desired, the air discharging end of the restricted passage 30 may be provided with a suction creating and air-displacing fan 59, the latter being driven by an electric motor 60.

*Operation*

When the engine is first started, for example, on a cold day, the driver closes the valve door 39 until the engine is warmed and hot water circulates to the top of the radiator. Then by opening the door 39, warm air will be driven into the car body by the engine fan. However, the warmed air passing through the restricted passage 30a will produce a suction on the cold or unheated air in the passage 25, which will flow in accordance with the amount of opening of the valve 29. If the operation of the engine is discontinued as, for instance, when the car is coasting down hill, the cold air passing through the restricted passage 30a will draw warmed air from the radiator in accordance with the degree of opening of the damper 28. Under average conditions of driving, both the warm and cool air will be under pressure from the fan 18 and the wind forces produced by car motion, and the volume of air flow will be regulated by the relation between the degree of opening of the valves 28 and 29, which are lifted by air pressure. This relationship is determined by the spread of the scissor levers 54, as determined by the thermostat bimetal coils 46 and 48 and the setting of the hand knob 41. The air thus tempered passes through the car and out through the floor valves 61, the casings of the latter being provided with rearwardly opening suction horns to increase draft therethrough.

A fan 59 may be provided, if desired, in the duct structure to produce air flow therethrough when neither the car nor the motor is running. Also, a control motor 62 may be used to adjust automatically the setting of the control knob 41 in accordance with the adjustment of an electrical thermostat 63, mounted within the body 10, whenever exacting automatic control is desired.

The chief advantage of my improved construction is to provide efficient and dependable operation by affording a practically unlimited heat supply and at the same time eliminate the use of additional fan motors, extra radiators, loss of engine cooling fluid and the drain on storage batteries due to the employment of current-consuming electrical apparatus.

Other advantages reside in the duct structure in the engine hood or bonnet, to utilize efficiently the heat available around the top of the main radiator for car-heating purposes; the balanced interconnected damper valves in the duct structure which open one another when either receives the impact of increased air velocity; the thermostatically controlled scissor levers which vary the relation between the two damper valves to regulate the intermingling of the cool and heated air and at the same time enabling the damper valves to swing freely to compensate for sudden changes in air flow through either passageway of the duct structure; the mechanically moved thermostatic mechanism joined with the scissor lever linkage, including a bimetallic element so disposed as to be free to seek its natural position without actually performing work, the said element merely holding the relationship established between the scissor levers after they have, by vibration, oscillation and by changing air action on the damper valves, moved into the correct relation; the long heat and sound insulated air duct which, together with the associated air filter, absorbs fan and motor noise; the convenient accessibility of the filter for replacement purposes, and the employment of floor mounted air outlets in the vehicle body which provide for the escape of cooled air and the uniform distribution of warmed air throughout the entire passenger accommodating space of the vehicle body.

While I have shown and described my invention in considerable detail, particularly with reference to one of its preferred embodiments, nevertheless, it will be understood that the same is subject to certain variation and modification without departure from its fundamental principles or the scope of the following claims.

I claim:

1. Air-conditioning apparatus for motor vehicles of the type having a liquid-cooled internal combustion engine, a heat-dissipating radiator for the liquid coolant of the engine, a fan driven by the engine, a passenger-receiving body and a movable hood arranged over the engine and radiator and disposed in front of said body, the improvement comprising a conduit structure formed in said hood, said structure being provided with upper and lower air passageways separated by a divisional wall, said passageways having open forward ends, one of said passageways receiving warmed air developed around the upper portion of said radiator and advanced therethrough by said fan, the other of said passageways having its open forward end disposed in advance of said radiator to receive and transmit air substantially unheated by the operation of said engine or radiator, the said passageways converging into a restricted velocity-increasing throat in which the heated and unheated air streams are merged, a duct in said hood communicating at its forward end with said throat and at its rear end with the interior of said vehicle body, and an air flow regulating valve movably mounted in each of said passageways, said valves being responsive automatically to forces developed by air flowing through said passages to move between positions of passageway opening and closure.

2. Air-conditioning apparatus for motor vehicles of the type having a liquid-cooled internal combustion engine, a heat-dissipating radiator for the liquid coolant of the engine, a fan driven by the engine, a passenger-receiving body and a movable hood arranged over the engine and radiator and disposed in front of said body, the improvement comprising a conduit structure formed in said hood, said structure being provided with upper and lower air passageways separated by a divisional wall, said passageways having open forward ends, one of said passageways receiving warmed air developed around the upper portion of said radiator and advanced therethrough by said fan, the other of said passageways having its open forward end disposed in advance of said radiator to receive and transmit air substantially unheated by the operation of said engine or radiator, the said passageways converging into a restricted velocity-increasing throat in which the heated and unheated air streams are merged, a duct in said hood communicating at its forward end with said throat and at its rear end with the interior of said vehicle body, an air flow regulating valve movably mounted in each of said passageways, said valves being responsive automatically to forces developed by air flowing through said passages to move between positions of passageway opening and closure, and pivotally movable lever means linking said valves for movement in unison.

3. Air-conditioning apparatus for motor vehicles of the type having a liquid-cooled internal combustion engine, a heat-dissipating radiator for the liquid coolant of the engine, a fan driven by the engine, a passenger-receiving body and a movable hood arranged over the engine and radiator and disposed in front of said body, the improvement comprising a conduit structure formed in said hood, said structure being provided with upper and lower air passageways separated by a divisional wall, said passageways having open forward air inlet ends, one of said passageways receiving warmed air developed around the upper portion of said radiator and advanced therethrough by said fan, the other of said passageways having its open forward end disposed in advance of said radiator to receive and transmit air substantially unheated by the operation of said engine or radiator, the said passageways converging into a restricted velocity-increasing throat in which the heated and unheated air streams are merged, and a duct in said hood communicating at its forward end with said throat and at its rear end with the interior of said vehicle body.

4. Air conditioning apparatus for motor vehicles of the type having a liquid-cooled internal combustion engine, a heat-dissipating radiator for the liquid coolant of the engine, a fan driven by the engine, a passenger-receiving body and a hingedly movable hood arranged over the engine and radiator, the improvement comprising a conduit structure formed in said hood, said structure being provided with a pair of air passageways separated by a divisional wall, said passageways having open forward ends, the open end of one of said passageways being disposed to receive warmed air developed around the upper portion of said radiator and advanced therethrough by said fan, the other of said passageways having its open forward end disposed to receive air substantially unheated by the operation of said engine and radiator, the said passageways converging into a common throat of restricted cross sectional area, movable valves arranged in said passageways for governing air flow therethrough, said valves being responsive automatically to forces developed by air flowing through said passages to move between positions of passageway opening and closure, a duct in said hood communicating at its forward end with said throat and at its rear end with the interior of said vehicle body, a manually adjustable thermostatic element positioned in said duct, pivoted lever means controlling the operative positions of said valves, and means linking said bimetallic element with said lever means.

5. Air conditioning apparatus for motor vehicles of the type having a liquid-cooled internal combustion engine, a heat-dissipating radiator for the liquid coolant of the engine, a fan driven by the engine, a passenger-receiving body and a movable hood arranged over the engine and radiator in front of said body, the improvement comprising a casing mounted beneath said hood and enclosing the upper portion of said radiator, said casing being slotted to receive the blades of said fan, a conduit structure formed in said hood, said structure being formed with upper and lower air passageways separated by a divisional wall, said passageways having open forward ends, the open forward end of the lower of said passageways being disposed in registration with the open upper end of said casing, the open forward end of the upper of said passageways being disposed in advance of said radiator to receive air substantially unheated by the operation of the engine and radiator, the said passageways converging into a restricted velocity-increasing throat in which the heated and unheated air streams are merged, a duct in said hood communicating at its forward end with said throat and at its rear end with the interior of said vehicle body, and an air flow regulating valve movably mounted in each of said passageways.

6. Air conditioning apparatus for motor vehicles of the type having a liquid-cooled internal combustion engine, a heat-dissipating radiator for the liquid coolant of the engine, a fan driven by the engine, a passenger-receiving body and a movable hood arranged over the engine and radiator in front of said body, the improvement comprising a casing mounted beneath said hood and enclosing the upper portion of said radiator, said casing being slotted to receive the blades of said fan, a conduit structure formed in said hood, said structure being formed with upper and lower air passageways separated by a divisional wall, said passageways having open forward ends, the open forward end of the lower of said passageways being disposed in registration with the open upper end of said casing, the open forward end of the upper of said passageways being disposed in advance of said radiator to receive air substantially unheated by the operation of the engine and radiator, the said passageways converging into a restricted velocity-increasing throat in which the heated and unheated air streams are merged, a duct in said hood communicating at its forward end with said throat and at its rear end with the interior of said vehicle body, an air flow regulating valve movably mounted in each of said passageways, and means disposed in said duct responsive to the temperature of the air passing therethrough to regulate the operating positions of said valves.

7. Air conditioning apparatus for motor vehicles of the type having a liquid-cooled internal combustion engine, a heat-dissipating radiator for the liquid coolant of the engine, a fan driven by the engine, a passenger-receiving body and a movable hood arranged over the engine and radiator in front of said body, the improvement comprising a casing mounted beneath said hood and enclosing the upper portion of said radiator, said casing being slotted to receive the blades of said fan, a conduit structure formed in said hood, said structure being formed with upper and lower air passageways separated by a divisional wall, said passageways having open forward ends, the open forward end of the lower of said passageways being disposed in registration with the open upper end of said casing, the open forward end of the upper of said passageways being disposed in advance of said radiator to receive air substantially unheated by the operation of the engine and radiator, the said passageways converging into a restricted velocity-increasing throat in which the heated and unheated air streams are merged, a duct in said hood communicating at its forward end with said throat and at its rear end with the interior of said vehicle body, an air flow regulating valve movably mounted in each of said passageways, said duct having registering movable and stationary regions, the movable region forming a part of said hood and the stationary section being formed with said body, and thermal insulation applied to the walls of the stationary and movable regions of said duct.

8. Air conditioning apparatus for motor vehicles of the type having a liquid-cooled internal combustion engine, a heat-dissipating radiator for the liquid coolant of the engine, a fan driven by the engine, a passenger-receiving body and a movable hood arranged over the engine and radiator in front of said body, the improvement comprising a casing mounted beneath said hood and enclosing the upper portion of said radiator, said casing being slotted to receive the blades of said fan, a conduit structure formed in said hood, said structure being formed with upper and lower air passageways separated by a divisional wall, said passageways having open forward ends, the open forward end of the lower of said passageways being disposed in registration with the open upper end of said casing, the open forward end of the upper of said passageways being disposed in advance of said radiator to receive air substantially unheated by the operation of the engine and radiator, the said passageways converging into a restricted velocity-increasing throat in which the heated and unheated air streams are merged, a duct in said hood communicating at its forward end with said throat and at its rear end with the interior of said vehicle body, an air flow regulating valve movably mounted in each of said passageways, said duct having registering movable and stationary regions, the movable region forming a part of said hood and the stationary section being formed with said body, thermal insulation applied to the walls of the stationary and movable regions of said duct, and air-filtering means arranged in the stationary region of said duct, said air filtering means being accessible when said duct is moved to an open position.

9. Air conditioning apparatus for motor vehicles of the type having a liquid-cooled internal combustion engine, a heat-dissipating radiator for the liquid coolant of the engine, a fan driven by the engine, a passenger-receiving body and a movable hood arranged over the engine and radiator in front of said body, the improvement comprising a conduit structure formed in said hood, said structure being provided with upper and lower air passageways separated by a divisional wall, said passageways having open forward ends, the open end of the lower of said passageways receiving warmed air developed around the upper portion of said radiator and advanced therethrough by said fan, the upper of said passageways having its upper forward end disposed in advance of said radiator to receive and transmit air substantially unheated by the operation of said engine and radiator, said passageways converging into a restricted velocity-increasing throat in which the heated and unheated air streams are merged, a duct in said hood communicating at its forward end with said throat and at its rear end with the interior of said vehicle body, an air flow regulating valve pivotally mounted for swinging movement in each of said passageways, said valves being so disposed and mounted as to move toward open positions in response to air flow through said passageways, counter-weighted slotted crank arms movable in unison with said valves, pivoted scissor-type levers engaged with said crank arms, a bimetallic element positioned in said duct and responsive to the temperature of the air passing therethrough, a shaft rotatable with said bimetallic element, a crank arm carried by said shaft, and link means uniting said crank arm with said scissor-type levers.

10. Air conditioning apparatus for motor vehicles of the type having a liquid-cooled internal combustion engine, a heat-dissipating radiator for the liquid coolant of the engine, a fan driven by the engine, a passenger-receiving body and a movable hood arranged over the engine and radiator in front of said body, the improvement comprising a conduit structure formed in said hood, said structure being provided with upper and lower air passageways separated by a divisional wall, said passageways having open forward ends, the open end of the lower of said passageways receiving warmed air developed around the upper portion of said radiator and advanced therethrough by said fan, the upper of said passageways having its upper forward end disposed in advance of said radiator to receive and transmit air substantially unheated by the operation of said engine and radiator, said passageways converging into a restricted velocity-increasing throat in which the heated and unheated air streams are merged, a duct in said hood communicating at its forward end with said throat and at its rear end with the interior of said vehicle body, an air flow regulating valve pivotally mounted for swinging movement in each of said passageways, said valves being so disposed and mounted as to move toward open positions in response to air flow through said passageways, counter-weighted slotted crank arms movable in unison with said valves, pivoted scissor-type levers engaged with said crank arms, a bimetallic element positioned in said duct and responsive to the temperature of the air passing therethrough, a shaft rotatable with said bimetallic element, a crank arm carried by said shaft, link means uniting said crank arm with said scissor-type levers, and means extending from the interior of said body for regulating the operating positions of said bimetallic element.

11. Air-conditioning apparatus for motor vehicles of the type having a liquid-cooled internal combustion engine, a heat-dissipating radiator for a liquid coolant for the engine, a fan driven by the engine, a passenger-receiving body and a movable hood arranged over the engine and radiator in front of said body, the improvement comprising a conduit structure stationarily mounted on and beneath said hood, said structure being provided at its forward end with spaced air passages, one of said passages being adapted for the travel of unheated air and the other of said passages for the travel of air warmed by said radiator, the said passages terminating at their rear ends in a duct leading to the passenger body, a valve mounted for swinging movement in each of said passages and being responsive to forces developed by air travel through said passages in assuming opened and closed positions, link means joined with said valves for causing the same to swing in unison, and thermostatically controlled means cooperative with said link means for varying the positional relationship of said valves.

GEORGE W. CRISE.

REFERENCES CITED

The following references are of record in the file of this patent:

UNITED STATES PATENTS

| Number | Name | Date |
|---|---|---|
| 1,361,567 | Diver | Dec. 7, 1920 |
| 1,446,725 | Shamberg | Feb. 27, 1923 |
| 1,870,374 | Mihaliak | Aug. 9, 1932 |
| 1,875,637 | Modine | Sept. 6, 1932 |
| 2,257,967 | LeFevre et al. | Oct. 7, 1941 |
| 2,264,945 | LeFevre | Dec. 2, 1941 |

FOREIGN PATENTS

| Number | Country | Date |
|---|---|---|
| 777,253 | France | Nov. 26, 1934 |
| 425,830 | Great Britain | Mar. 22, 1935 |